INVENTOR
Richard Binder
by:
Michael S. Striker
agt.

Dec. 10, 1957   R. BINDER   2,815,839
CLUTCH ARRANGEMENT
Filed Feb. 7, 1955   3 Sheets-Sheet 3

INVENTOR
Richard Binder
by:
Michael S. Striker
agt.

United States Patent Office 2,815,839
Patented Dec. 10, 1957

2,815,839
CLUTCH ARRANGEMENT

Richard Binder, Schweinfurt (Main), Germany, assignor to Firma Fichtel & Sachs A. G., Schweinfurt (Main), Germany Application February 7, 1955, Serial No. 486,631
Claims priority, application Germany February 13, 1954
2 Claims. (Cl. 192—99)

The present invention relates to a clutch arrangement, and more particularly to a self-locking toggle lever shifting arrangement for operating a friction clutch.

The arrangement according to the present invention is mainly intended for use with road building machines, bulldozers, self-propelled surface levelling rollers and similar heavy vehicles provided with heavy duty clutches.

Generally vehicles and machines of this type are provided with clutches of the type used in motor cars. However, clutches of this type are not self-locking in released position and are not very well suited for the great loads occurring in machines of the above defined type.

It is also known to provide heavy vehicles with self-locking clutches, which however, have the disadvantage that the amount of torque that can be transmitted is considerably reduced after only slight wear of the clutch.

It is the object of the present invention to overcome the disadvantages of the known clutches for heavy duty vehicles, and to provide a clutch arrangement which permits transmitting of torque even if the clutch is worn off.

It is another object of the present invention to provide a clutch arrangement employing self-locking toggle levers.

It is a further object of the present invention to provide in a clutch a resilient member holding the pressure plate of the clutch in operative position to compensate wear of the clutch.

It is another object of the present invention to pretension the resilient member so that the pressure of the same on the shifting member remains substantially constant as the clutch is progressively worn.

A further object of the present invention is to provide means preventing a bending of the pressure plate under the action of the toggle lever means.

With these objects in view the present invention mainly consists in a clutch operating arrangement which comprises, in combination, a pressure plate means movable between an operative position and an inoperative position; means urging the pressure plate means into the inoperative position; a resilient member; shifting means engaging the resilient member and the pressure plate means, the shifting means being movable between a contracted position and an expanded position, the shifting means moving during movement from the contracted position to the expanded position first the pressure plate means to the operative position and then actuating the resilient member; and operating means connected to the shifting means for moving the shifting means between the expanded and contracted positions.

Preferably, the shifting means include toggle lever means which are self-locking at least in the operative position in which the pressure plate effects coupling of the clutch.

According to a preferred embodiment of the present invention the shifting means includes an annular member supporting toggle lever means. The annular member engages the resilient member which is preferably an annular pretensioned spring mounted on a stationary support so that regardless of the wear of the clutch the annular pretensioned spring holds the pressure plate in operative position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
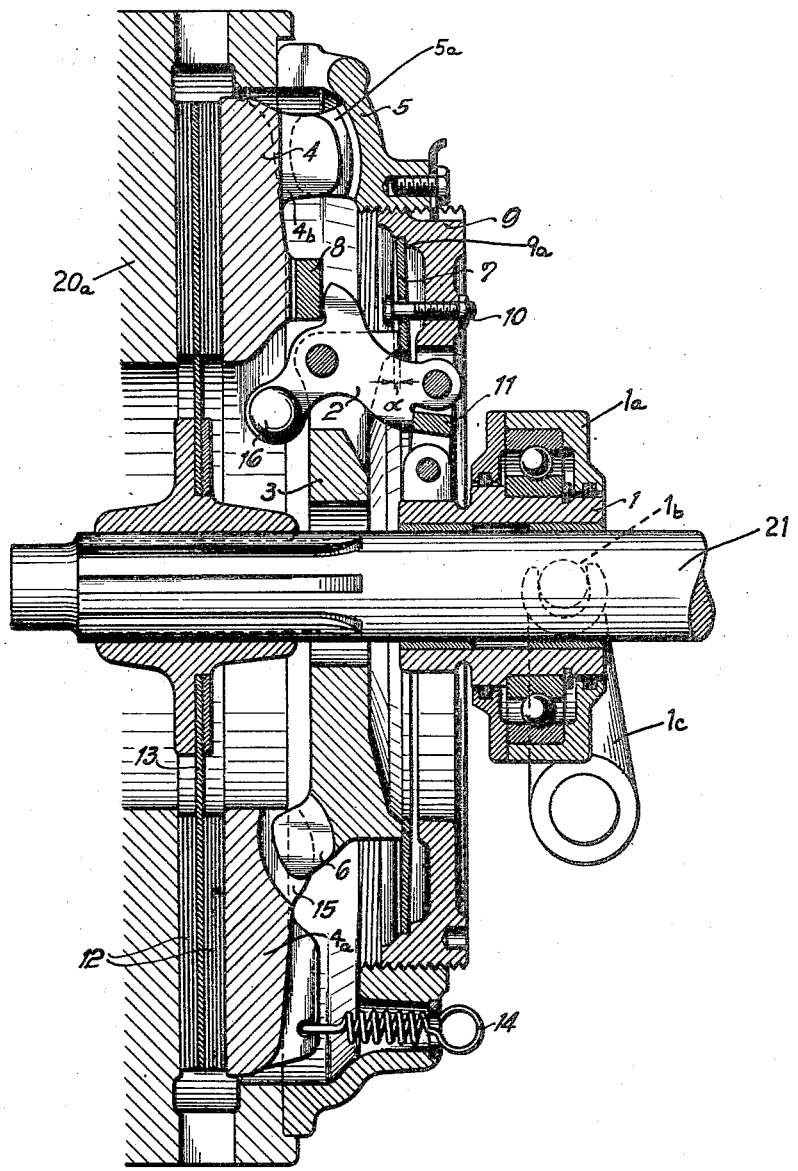
Fig. 1 is an axial sectional view of a clutch arrangement according to the present arrangement.
Figure 2:
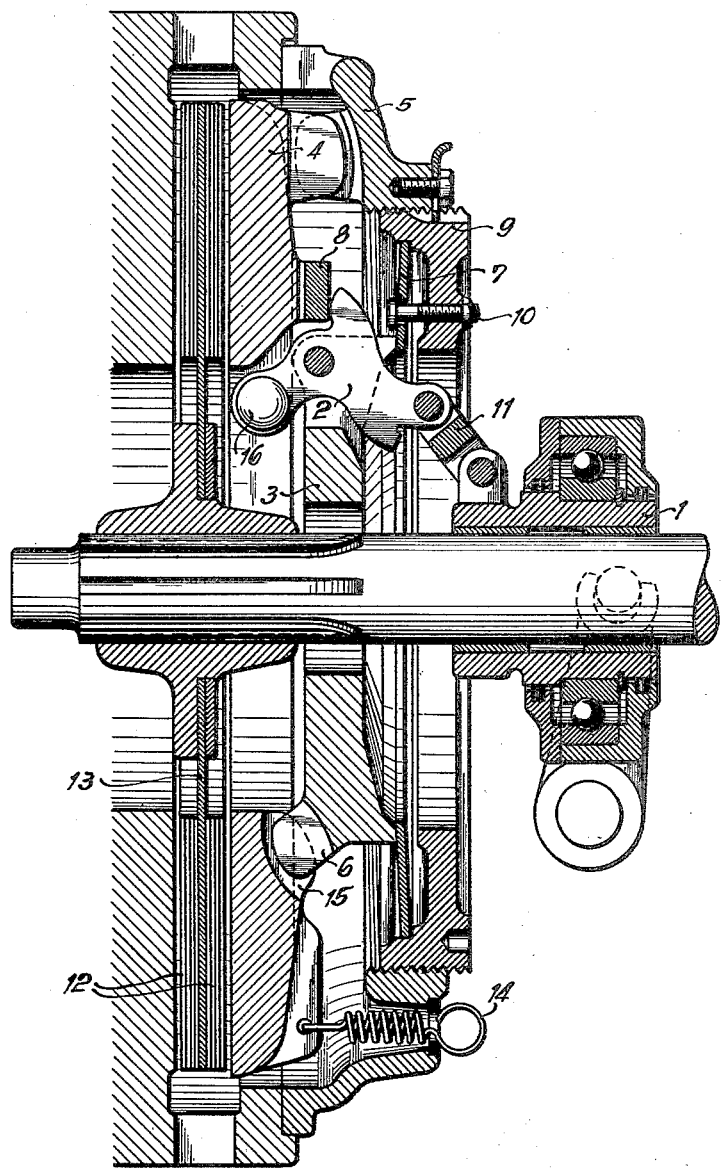
Fig. 2 is an axial sectional view similar to Fig. 1 and showing another position of the arrangement.

Referring now to the drawings, and more particularly to Figs. 1 and 2, which show the clutch arrangement according to the present invention in coupled and released positions, the clutch includes a stationary member 20, a movable friction disc member 12, and a movable pressure plate means 4 which is movable in axial direction between the inoperative position illustrated in Fig. 2 and the operative position illustrated in Fig. 1 in which the friction disc means 12 is pressed against stationary member 20.

Figure 3:
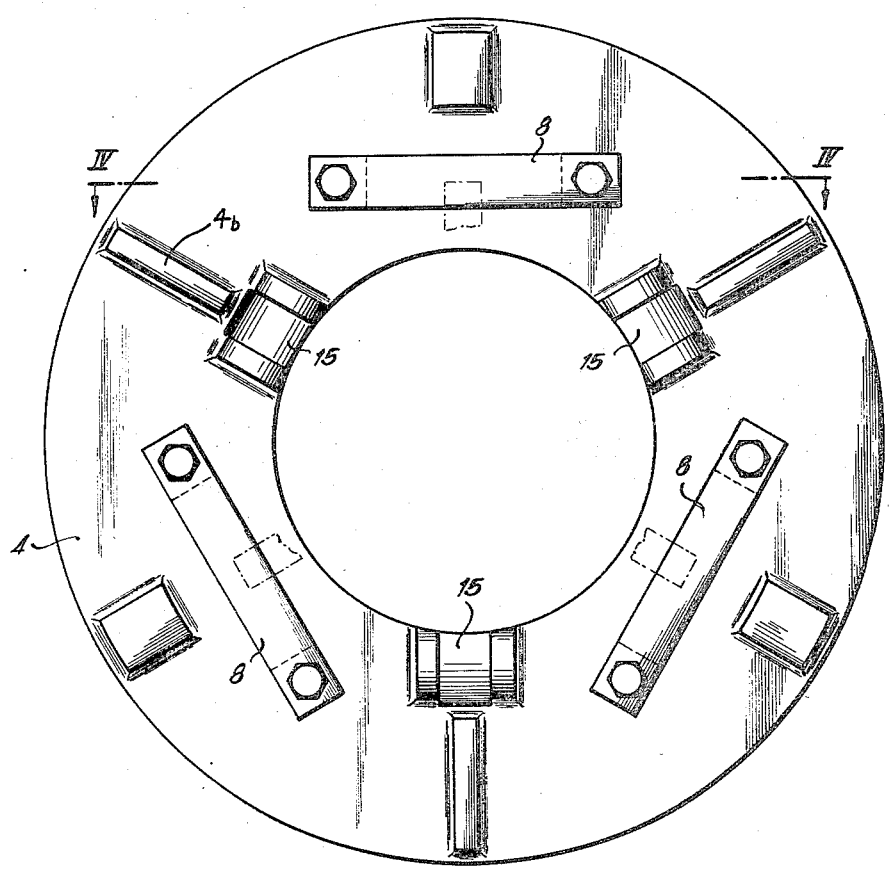
Fig. 3 is an end view of the pressure plate.
Figure 4:
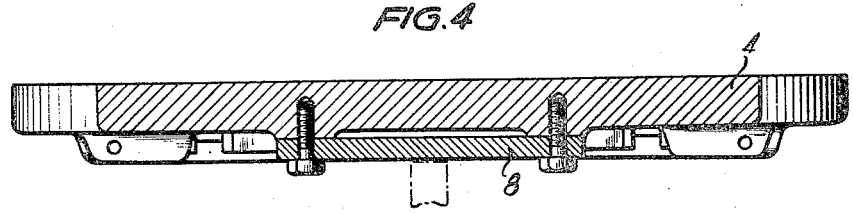
Fig. 4 is a sectional view taken on line 4—4 in Fig. 3.

The pressure plate means 4 includes a pressure plate 4a, and a plurality of pressure transmitting members 8, which are best seen in Figs. 3 and 4. A toggle lever shifting means is provided for shifting the pressure plate means 4 and includes an annular member 3, and a set of toggle levers 2, 11. Each toggle lever comprises a first lever 2 pivotally mounted on the annular member 3 and engaging the center portion of a member 8, and a second lever 11 pivotally connected to lever 2, and having a free end pivotally connected to an operating means 1 which is illustrated to be a sleeve slidably mounted on the shaft 21. Sleeve 1 has a freely turnable portion 1a provided with pins 1b engaged by an operating lever 1c by which sleeve 1 is shifted.

A stationary support 5 is fixedly connected to the stationary clutch member 20 and has an inner thread into which an adjusting ring 9 is threaded. Adjusting ring 9 has a shoulder 9a supporting one peripheral edge of an annular resilient member 7 whose other peripheral edge is engaged by the annular member 3. Adjusting screws 10 are mounted in the adjusting ring 9 and engage the annular spring 7 so that the same can be pretensioned. In the position shown in Fig. 2, the annular spring 7 is pretensioned, and the arrangement is such that the tension of the annular spring 7 remains substantially constant while the same is actuated to move the distance $a$ as shown in Fig. 1. The pressure plate means 4 is connected by springs 14 to the stationary support 5, and is urged by springs 14 into the inoperative position illustrated in Fig. 2.

The stationary support 5 is provided with recesses 5a for guiding the projections 4b of the pressure plate 4a. The pressure plate 4a is provided with recesses 15 for guiding the projections 6 on the annular member 3.

The clutch arrangement is operated in the following manner:

In the position of Fig. 2 the annular member 3 engages the pretensioned annular spring 7 and the toggle levers 2, 11 engage the pressure plate means 4. The pressure plate means 4 is urged by springs 14 into the inoperative position shown in Fig. 2 in which the friction disc means 12 is spaced from the clutch member 20 so that the clutch is released. When the operating sleeve 1 is shifted into the position illustrated in Fig. 1, each toggle lever 2, 11 is moved to an operative position in which the pressure plate 4a is shifted to the operative position connecting the clutch as shown in Fig. 1. When the pressure plate 4a has arrived in its operative position connecting the clutch, it cannot move further so that the annular member 3 moves to the right and actuates the pretensioned annular spring 7 so that the same moves the distance $a$ in Fig. 1. Since the pressure plate is pressed in this position against the friction disc means 12 by the pretensioned annular spring 7, wear of the friction disc means will not influence the reliable coupling of the clutch until the annular spring 7 assumes the position illustrated in Fig. 2, although the toggle lever shifting means 2 and 11 are shifted to the position shown in Fig. 1. Consequently, the distance $a$ is the measure of the permissible wear of the friction disc means 12. After the friction disc means 12 have been worn to such an extent that the annular spring 7 abuts against the adjusting screws 10 even in operative position of the toggle lever shifting means, the adjusting ring 9 is adjusted until the original conditions illustrated in Figs. 1 and 2 are again obtained. According to a preferred embodiment, the distance $a$ is 1 mm. so that an adjusting of the clutch is only necessary after the friction disc means 12 have been worn out approximately 1 mm.

As shown in Fig. 1, the lever 11 of the toggle lever 2, 11, is self-locked in the operative position of the toggle lever shifting means illustrated in Fig. 1. In other words, to assume the position shown in Fig. 1, the lever 11 has to move from the position shown in Fig. 2 in which it is inclined about 45°, through an intermediate position to the position shown in Fig. 1 in which it is inclined a small angle in opposite direction. It will be understood that the compression of the annular spring 7 is greatest when the lever 11 passes through the intermediate position in which it is perpendicular to the direction of movement of the sleeve 1 so that further movement of the sleeve 1 and of lever 11 into the position shown in Fig. 1 will lock the toggle levers 2, 11.

Counterbalancing weights 16 are provided on each toggle lever to compensate the action of the centrifugal force on the toggle lever system. The centrifugal weights 16 are so dimensioned that the centers of gravity of the toggle levers are located substantially at the turning points of the same.

The pressure transmitting members 8 have central portions engaged by the toggle levers 2, and spaced from the pressure plate 4a. Either the pressure transmitting members 8 are recessed, or the pressure plate surface is recessed to provide a gap between the center portion of the pressure transmitting members 8 and the surface of the pressure plate 4a. The result of this arrangement is that the pressure of the toggle levers is distributed more evenly on the pressure plate so that a bending of the same at the engaged points is prevented.

The ends of adjacent pressure transmitting members 8 are preferably spaced from each other a distance corresponding to the length of the pressure transmitting members so that the pressure is uniformly distributed over the pressure plate 4a.

According to a preferred embodiment, three toggle levers 2, 11 are provided which cooperate with three pressure transmitting members 8, as shown in Fig. 3.

It will be understood that each of the elements described above, or two or more together, may also find a useful application in other types of clutch arrangements differing from the types described above.

While the invention has been illustrated and described as embodied in a clutch operating arrangement including toggle lever shifting means and a resilient member for compensating the wear of the clutch, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a friction clutch including a stationary member and movable friction disc means, in combination, a pressure plate means having an axis and being movable in axial direction between an inoperative position and an operative position for pressing said friction disc means against said stationary member; a stationary support; spring means connected to said stationary support and to said pressure plate and urging the latter into said inoperative position; an adjusting ring threadedly connected to said stationary support and being adjustable in axial direction; an annular spring having one peripheral edge supported on said adjusting ring; adjusting screw means extending in axial direction and mounted on said adjusting ring and said screw means engaging said annular spring for pretensioning the same; an annular member movable in axial direction and engaging the other peripheral edge of the pretensioned annular spring; toggle lever means pivotally mounted on said annular member and engaging said pressure plate means, said toggle lever means being movable between an operative position and an inoperative position and moving during movement from said inoperative position to said operative position first said pressure plate means to operative position and then moving said annular member to actuate said annular pretensioned spring, said toggle lever means being self-locking at least in said operative position; and operating means connected to said toggle lever means for moving the same between said operative and inoperative positions.

2. In a friction clutch including a stationary member and movable friction disc means, in combination, a pressure plate means having an axis and being movable in axial direction between an inoperative position and an operative position for pressing said friction disc means against said stationary member, said pressure plate means including a pressure plate and a plurality of pressure transmitting members mounted on said pressure plate, each of said pressure transmitting members having end portions engaging said pressure plate and a central portion spaced from said pressure plate; a stationary support; spring means connected to said stationary support and to said pressure plate and urging the latter into said inoperative position; an adjusting ring threadedly connected to said stationary support and being adjustable in axial direction; an annular spring having one peripheral edge supported on said adjusting ring; adjusting screw means mounted on said adjusting ring and engaging said annular spring for pretensioning the same; an annular member movable in axial direction and engaging the other peripheral edge of the pretensioned annular spring; toggle lever means pivotally mounted on said annular member and engaging said central portions of said pressure transmitting members of said pressure plate means, said toggle lever means being movable between an operative position and an inoperative position and moving during movement from said inoperative position to said operative position first said pressure plate means to said operative positions and then moving said annular member to actuate said annular pretensioned spring, said toggle lever means being self-locking at least in said operative position; and operating means connected to said toggle lever means for moving the same between said operative and inoperative positions.

References Cited in the file of this patent

UNITED STATES PATENTS

| | | |
|---|---|---|
| 1,646,125 | Tuttle | Oct. 18, 1927 |
| 2,129,361 | Ruesenberg et al. | Sept. 6, 1938 |
| 2,287,630 | Miller | June 23, 1942 |
| 2,700,444 | Ahlen | Jan. 25, 1955 |